US012675322B2

(12) United States Patent　　(10) Patent No.:　US 12,675,322 B2
Bashir　　(45) Date of Patent:　Jul. 7, 2026

(54) SYSTEMS AND METHODS FOR PROVIDING AN ENTERPRISE ROLLUP PLATFORM

(71) Applicant: JPMORGAN CHASE BANK, N.A., New York, NY (US)

(72) Inventor: Imran Bashir, Stratford (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 421 days.

(21) Appl. No.: 18/405,660

(22) Filed: Jan. 5, 2024

(65) Prior Publication Data

US 2025/0224981 A1　　Jul. 10, 2025

(51) Int. Cl.
G06F 9/48　　(2006.01)
G06F 9/455　　(2018.01)

(52) U.S. Cl.
CPC ........ G06F 9/4881 (2013.01); G06F 9/45533 (2013.01)

(58) Field of Classification Search
CPC ........................... G06F 9/4881; G06F 9/45533
See application file for complete search history.

(56) References Cited

U.S. PATENT DOCUMENTS

2019/0164153 A1*　5/2019　Agrawal ............. G06Q 20/065

* cited by examiner

*Primary Examiner* — Wissam Rashid
(74) *Attorney, Agent, or Firm* — GREENBERG TRAURIG LLP

(57) ABSTRACT

In some aspects, the techniques described herein relate to a method including: receiving, at a rollup platform, a transaction request, wherein the transaction request includes an instructional parameter; generating, by the rollup platform, a transaction batch including the transaction request and other transaction requests, each having the same instructional parameter; executing, by a virtual machine of the rollup platform, the transaction batch, wherein the virtual machine is configured to execute a type of transaction indicated by the instructional parameter, and wherein executing the transaction batch generates a rollup block; generating, by the rollup platform, a validity proof for the rollup block; generating, by the rollup platform, a data package including the rollup block, the validity proof, and metadata, wherein the metadata indicates a batch type; and routing the data package to a destination chain based on the batch type for recordation on the destination chain.

20 Claims, 4 Drawing Sheets

100

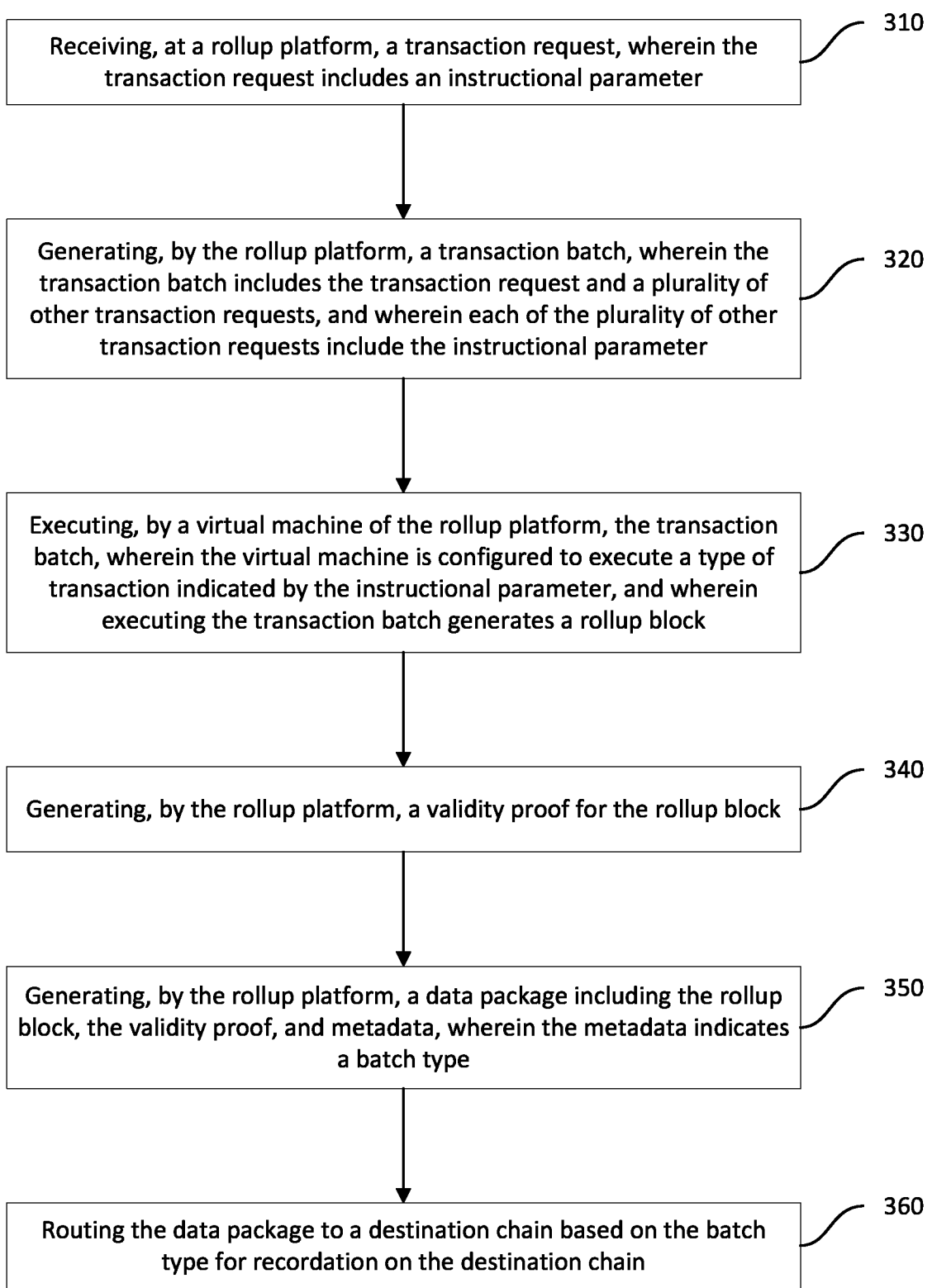

Receiving, at a rollup platform, a transaction request, wherein the transaction request includes an instructional parameter — 310

Generating, by the rollup platform, a transaction batch, wherein the transaction batch includes the transaction request and a plurality of other transaction requests, and wherein each of the plurality of other transaction requests include the instructional parameter — 320

Executing, by a virtual machine of the rollup platform, the transaction batch, wherein the virtual machine is configured to execute a type of transaction indicated by the instructional parameter, and wherein executing the transaction batch generates a rollup block — 330

Generating, by the rollup platform, a validity proof for the rollup block — 340

Generating, by the rollup platform, a data package including the rollup block, the validity proof, and metadata, wherein the metadata indicates a batch type — 350

Routing the data package to a destination chain based on the batch type for recordation on the destination chain — 360

FIGURE 3

SYSTEMS AND METHODS FOR PROVIDING AN ENTERPRISE ROLLUP PLATFORM

BACKGROUND

1. Field of the Invention

Aspects generally relate to systems and methods for providing an enterprise rollup platform.

2. Description of the Related Art

Processing transactions on the main chain of a blockchain-based platform (i.e., on "layer 1") can be slow and expensive, particularly when transaction volume is high for an extended period. In order to lower transaction costs and increase efficiency in processing transactions, organizations have implemented "layer 2" solutions that preprocess transactions off of the main chain, compress the transactions, roll a number of processed transactions into a batch (i.e., a "rollup"), and post the batch to the main chain (or, optionally, keep the transaction off-chain) along with a validity proof. While these layer 2 solutions can reduce costs and make transaction processing more efficient, they do not offer the needed flexibility and interoperability needed by organizations that provide access to multiple blockchains at scale while preserving privacy when required.

SUMMARY

In some aspects, the techniques described herein relate to a method including: receiving, at a rollup platform, a transaction request, wherein the transaction request includes an instructional parameter; generating, by the rollup platform, a transaction batch, wherein the transaction batch includes the transaction request and a plurality of other transaction requests, and wherein each of the plurality of other transaction requests include the instructional parameter; executing, by a virtual machine of the rollup platform, the transaction batch, wherein the virtual machine is configured to execute a type of transaction indicated by the instructional parameter, and wherein executing the transaction batch generates a rollup block; generating, by the rollup platform, a validity proof for the rollup block; generating, by the rollup platform, a data package including the rollup block, the validity proof, and metadata, wherein the metadata indicates a batch type; and routing the data package to a destination chain based on the batch type for recordation on the destination chain.

In some aspects, the techniques described herein relate to a method, wherein the rollup block is compressed.

In some aspects, the techniques described herein relate to a method, wherein the rollup platform is a node in a networked environment of rollup platforms.

In some aspects, the techniques described herein relate to a method, wherein the instructional parameter indicates either a public destination chain or a private destination chain, and wherein the instructional parameter indicates either an encrypted transaction type or an unencrypted transaction type.

In some aspects, the techniques described herein relate to a method, wherein the instructional parameter indicates the public destination chain and the unencrypted transaction type.

In some aspects, the techniques described herein relate to a method, wherein the instructional parameter indicates the private destination chain and the unencrypted transaction type.

In some aspects, the techniques described herein relate to a method, wherein the instructional parameter indicates the private destination chain and the encrypted transaction type.

In some aspects, the techniques described herein relate to a system including at least one computer including a processor and a memory, wherein the at least one computer is configured to: receive, at a rollup platform, a transaction request, wherein the transaction request includes an instructional parameter; generate, by the rollup platform, a transaction batch, wherein the transaction batch includes the transaction request and a plurality of other transaction requests, and wherein each of the plurality of other transaction requests include the instructional parameter; execute, by a virtual machine of the rollup platform, the transaction batch, wherein the virtual machine is configured to execute a type of transaction indicated by the instructional parameter, and wherein executing the transaction batch generates a rollup block; generate, by the rollup platform, a validity proof for the rollup block; generate, by the rollup platform, a data package including the rollup block, the validity proof, and metadata, wherein the metadata indicates a batch type; and route the data package to a destination chain based on the batch type for recordation on the destination chain.

In some aspects, the techniques described herein relate to a system, wherein the rollup block is compressed.

In some aspects, the techniques described herein relate to a system, wherein the rollup platform is a node in a networked environment of rollup platforms.

In some aspects, the techniques described herein relate to a system, wherein the instructional parameter indicates either a public destination chain or a private destination chain, and wherein the instructional parameter indicates either an encrypted transaction type or an unencrypted transaction type.

In some aspects, the techniques described herein relate to a system, wherein the instructional parameter indicates the public destination chain and the unencrypted transaction type.

In some aspects, the techniques described herein relate to a system, wherein the instructional parameter indicates the private destination chain and the unencrypted transaction type.

In some aspects, the techniques described herein relate to a system, wherein the instructional parameter indicates the private destination chain and the encrypted transaction type.

In some aspects, the techniques described herein relate to a non-transitory computer readable storage medium, including instructions stored thereon, which instructions, when read and executed by one or more computer processors, cause the one or more computer processors to perform steps including: receiving, at a rollup platform, a transaction request, wherein the transaction request includes an instructional parameter; generating, by the rollup platform, a transaction batch, wherein the transaction batch includes the transaction request and a plurality of other transaction requests, and wherein each of the plurality of other transaction requests include the instructional parameter; executing, by a virtual machine of the rollup platform, the transaction batch, wherein the virtual machine is configured to execute a type of transaction indicated by the instructional parameter, and wherein executing the transaction batch generates a rollup block; generating, by the rollup platform, a validity proof for the rollup block; generating, by the rollup platform, a data package including the rollup block, the validity proof, and metadata, wherein the metadata indicates a batch type; and routing the data package to a destination chain based on the batch type for recordation on the destination chain.

In some aspects, the techniques described herein relate to a non-transitory computer readable storage medium, wherein the rollup block is compressed.

In some aspects, the techniques described herein relate to a non-transitory computer readable storage medium, wherein the rollup platform is a node in a networked environment of rollup platforms.

In some aspects, the techniques described herein relate to a non-transitory computer readable storage medium, wherein the instructional parameter indicates either a public destination chain or a private destination chain, and wherein the instructional parameter indicates either an encrypted transaction type or an unencrypted transaction type.

In some aspects, the techniques described herein relate to a non-transitory computer readable storage medium, wherein the instructional parameter indicates the public destination chain and the unencrypted transaction type.

In some aspects, the techniques described herein relate to a non-transitory computer readable storage medium, wherein the instructional parameter indicates the private destination chain and the unencrypted transaction type.

BRIEF DESCRIPTION OF THE DRAWINGS

FIG. 3 is a logical flow for providing an enterprise rollup platform, in accordance with aspects.

DETAILED DESCRIPTION

Figure 1:
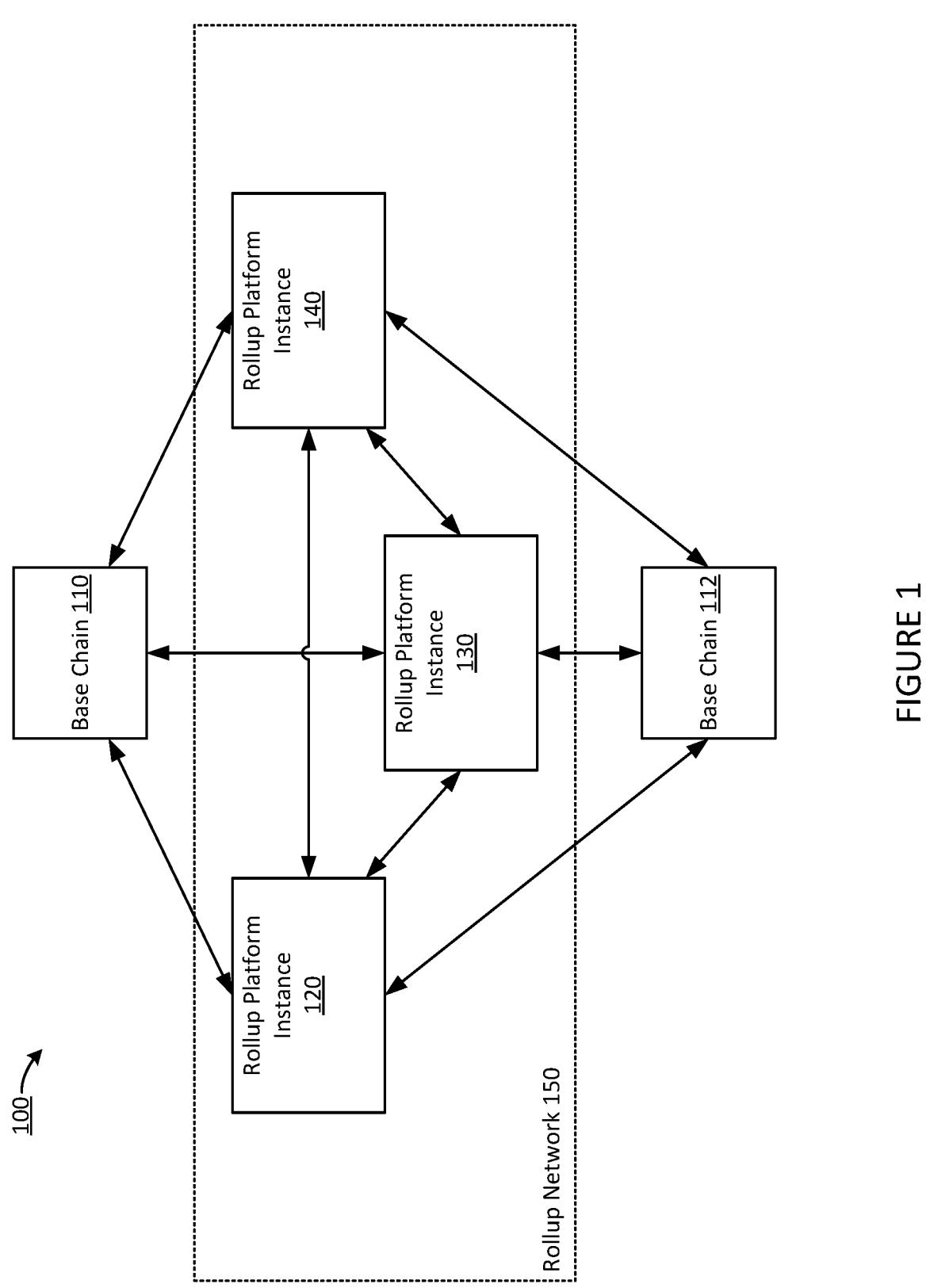
FIG. 1 is a block diagram of a system for providing an enterprise rollup platform, in accordance with aspects.

Aspects generally relate to systems and methods for providing an enterprise rollup platform.

With respect to blockchains and blockchain protocols, the term "rollup" refers to a scaling solution. Rollup architectures are built on top of a main or base blockchain (a "base chain") environment. A base blockchain environment is known as a "layer 1" environment and a rollup environment is referred to as a "layer 2" environment and/or "layer 2 scaling". A rollup platform may receive transactions and may execute the transactions locally (i.e., on a local "virtual machine," described in more detail, herein). Local virtual machines are "local" with respect to an associated base chain, and it is this environment (e.g., a rollup platform executing a virtual machine) that is commonly referred to as "layer 2".

A rollup environment or platform receives transactions from transacting entities, such as individuals and institutions, batches the transactions as rollups and executes the batched rollups as an aggregate at the local rollup platform, thereby relieving the base chain from the burden of executing the received transactions. Multiple transactions compressed into a single batch "rollup" of transactions results in performance gains vis-à-vis the base chain. Accordingly, scaling the number of rollup environments associated with a base chain allows scaling of the number of transactions that the base chain can record.

Rollup platforms may bundle multiple transactions into a batch, execute the batched transactions, and submit a data package to a corresponding base chain. A data package may include a rollup block, a validity proof, compressed transaction data, and other data, such as additional transaction metadata, as is necessary or desired. A rollup block is a block of transaction data that represents transactions executed by a rollup platform, and that may be written or "posted" as a block to a base chain. The rollup block may be posted to the base chain if a corresponding validity proof is verified by the base chain (e.g., by a smart contract that executes at the base chain). The rollup block represents, on the base chain, the execution of all transactions in the "rolled up" batch of transactions that were previously executed off the base chain at the rollup platform. A rollup block posted to a base chain may represent many (e.g., thousands, or more) transactions that are batched and executed at a rollup platform.

A zero knowledge (ZK) rollup is a type of rollup/rollup protocol that generates mathematical validity proofs and incorporates the validity proofs in a validation scheme for submitted transactions. ZK rollups facilitate compression of transaction data included in a rollup block to be posted on a base chain. This compression allows for scalability because more transactions can be written to a single block of the base chain. A base chain may include block size limits by design and can contain only a certain number of transactions. As ZK-rollups compress the transaction data, however, the number of transactions processed in a base chain block may be increased significantly, thus resulting in scalability.

As used herein, the term "virtual machine" (VM) refers to a centralized computation engine that is responsible for maintaining the state of a corresponding blockchain (e.g., execution of and adherence to a given blockchain's operating protocol). A roll up platform may implement a version of the virtual machine used by its corresponding base chain platform. For instance, in an Ethereum® blockchain platform (i.e., an Ethereum base chain), an Ethereum virtual machine (EVM) is the decentralized computation engine that is responsible for maintaining the state of the underlying blockchain by ensuring adherence to the Ethereum protocol. A virtual machine is responsible for deployment and execution of smart contracts on a platform. Each node in a decentralized blockchain platform may execute a virtual machine, and associated rollup platforms may also execute a version (e.g., a rollup-specific version) of the platform's virtual machine.

A ZK-based rollup platform inherits the security of its corresponding base chain, thereby incorporating the security features of the base chain. In a rollup platform system, the base chain acts as a "data availability layer," which allows any user or entity to recreate the associated state of the roll-up platform and perform a corresponding validation of the rollup's state. This is possible because ZK-rollup platforms publish state data for every transaction that has been processed on the local, off-chain VM executing at the rollup platform. Moreover, the associated base chain serves as a settlement layer where the rolled-up transactions are eventually finalized. The transactions are only considered final and settled when/if a corresponding base chain verification smart contract accepts the zero-knowledge validity proof produced by the rollup platform. That is, a rollup block may only be written to a base chain once a verification smart contract has accepted the corresponding validity proof of the rollup block that is included in the data package sent to the base chain. In some aspects, a data availability layer is maintained off of a base chain and the base chain is used only for writing validity proofs.

The link between a rollup provider and a corresponding base chain is based on smart contracts. Upon receipt of a data package (including a rollup block and a validity proof) at a base chain platform, a smart contract (e.g., a smart contract that was deployed to the base chain by the rollup platform) mathematically verifies that the rollup batch transactions represented by the rollup block were valid and were properly performed by the rollup platform before recording the rollup block to the base chain. In essence, a rollup block represents state changes to the state of a virtual machine of a rollup platform, which changes were made via the execution of the transactions represented in the rollup block. The state changes are captured in a rollup block, which is the result of execution of a rollup of batch transactions by a rollup platform. The receiving smart contract verifies that the rollup batch has been properly executed and the state changes are valid, and then records the state changes on the base chain by recording the rollup block to the base chain (e.g., as a new block at the base chain).

With reference to transaction execution, if a transaction submitted to a rollup platform is not in the correct format (i.e., is not properly signed or does not pass other validity checks), the rollup platform will flag the transaction as malicious or otherwise improper. An improperly formed transaction will be rejected by the rollup platform and will not be included in a rollup batch, will not be executed and, accordingly, will not be reflected in the state change data (i.e., the rollup block) sent to the base chain for recordation. As noted, above, the base chain serves as a "data availability" provider and as a "settlement layer" for a ZK-rollup. ZK-rollups post state data for every transaction executed at a rollup platform and any user can independently reproduce the state of the rollup provider and can validate the blockchain. Transactions executed at a rollup platform are only finalized on a corresponding base chain if the base chain verification smart contract is able to verify and accept the zero-knowledge validity proof that corresponds to the submitted rollup block and that is submitted by the rollup platform.

As noted, above, rollup platforms provide the ability to scale a base chain well beyond what may otherwise be achievable. Conventional rollup platforms, however, also have drawbacks for enterprise level organizations, particularly those organizations that may provide access to more than one base chain for transaction recordation/finalization. For instance, most rollup platforms are controlled by a third party. Accordingly, an organization or a consortium of organizations may lack the necessary granular control that is required for tight integration into the organization's, or consortium's, environment. Moreover, conventional rollup platforms are configured to submit rollup blocks to a particular base chain environment, and an enterprise organization or consortium may require a more complex platform that can effectively roll transactions up and post validity proofs to various base chains, and provide scalability along with privacy, as required.

Aspects described herein may provide an enterprise level rollup platform (i.e., a layer 2 platform) configured for execution in a blockchain diverse environment. Aspects may provide for identification of a transaction type, for routing to diverse base chains, and for interoperability and communication with member nodes of a distributed rollup platform blockchain (network) environment.

In accordance with aspects, each instance of an enterprise rollup platform may include a sequencing engine. A sequencing engine may be configured to order and/or sort received transactions into a particular sequence. A sequencing engine may be configured to receive transaction orders from entities such as individuals and institutions. An exemplary transaction order may include instructions to transfer a specified amount of a cryptographic currency (a "crypto" currency) from one account (also known as a "wallet") on a base chain to another account on the base chain. A sequencing engine may include a front-end interface for receiving transaction orders (e.g., an interface provided via an application executed on a client device or a published web page/site that may be accessed via a browser on a client device). A front-end interface may be a graphical user interface. Aspects may include a programmatic interface, such as an application programming interface (API). An API may receive transaction orders from a front-end interface, or directly from other programs. Other programs may include a wallet issued to a client user with appropriate verifiable credentials issued by o providing organization through the rollup platform to allow the users (i.e., a verifiable credential holder) to perform certain functions on the rollup platform by using the wallet for example to create, sign and submit transactions.

An API of a sequencing engine (and/or a ZK-rollup platform, generally) may publish API methods that may be called from a front-end interface or from other programs. The methods may require method parameters or arguments to be supplied. For instance, in a transaction order method, an API interface may require an "amount" parameter that indicates an amount of crypto currency to transfer. Other parameters may be required or optional, as well.

In accordance with aspects, an enterprise rollup platform may be configured to receive different types of transaction orders. Exemplary transaction orders may include a public transaction, a public-confidential transaction, a semi-private transaction, and a fully-private transaction. Each of the transaction types may include a certain level of encryption and may indicate a particular type of destination chain. As used herein the term "destination chain" refers to a base chain that will be the chain at which a submitted transaction will be recorded on.

In accordance with aspects, a public transaction may be a transaction with no payload encryption and that posts to (i.e., is recorded on) and settles at a public base chain. A public transaction may be thought of as a standard or conventional transaction request having no confidentiality due to being posted in clear text (i.e., without encryption). A public-confidential transaction is a transaction where the transaction payload is encrypted (e.g., using proofs) and is posted to and settled at a public base chain. A semi-private transaction is a transaction whose transaction payload is not encrypted but it is posted to and settled on a private base chain. A fully-private transaction is a transaction whose payload is encrypted and that is posted to and settles on a private base chain. A fully-private transaction may be considered the most secure type of the listed transactions because it may be configured to not leave the enterprise environment (i.e., an organization's technology infrastructure or a consortium's private infrastructure/network) and its payload is encrypted, thereby providing confidentiality.

As used herein, a public base chain refers to a blockchain platform that is open to public transactions. That is, any entity may establish an account, or wallet, on the platform and submit transactions to the blockchain of the platform. A private base chain refers to a blockchain platform that is implemented and controlled by an individual, an organization, or a consortium of organizations. Only entities with the implementing entity's (or entities') permission may establish accounts on a private blockchain platform. A private base chain may be maintained wholly inside an implementing organization's technology infrastructure, or within the technology infrastructures of a consortium of implementing organizations and may be offered as a service to customers of the implementing organizations. As noted above, some organizations may require access to one or more public base chains and one or more private base chains. For instance, an organization may wish to service, from a unitary rollup platform, users (e.g., customers) that require access to both a public base chain (e.g., the public Ethereum® chain) and a private base chain implemented by the organization.

In accordance with aspects, an API method published by a rollup platform may require a parameter that indicates a type of transaction that is being submitted to the rollup platform. The parameter may indicate to the platform a desired encryption state (i.e., encrypted, or unencrypted) for a submitted transaction. The parameter (or a separate parameter) may also indicate a desired destination chain for posting of a submitted transaction. As used herein, the term "instructional parameter" refers to one or more parameters that indicate instructions with respect to a corresponding transaction submitted to a rollup platform. The instruction may indicate an encryption state, a destination chain, and other variables that a rollup platform may determine based on the value of instructional parameters.

For instance, an exemplary instructional parameter may be an integer, where the value of the integer indicates the desired encryption state and desired destination chain for a corresponding submitted transaction. That is, for example, a parameter value of 1 may indicate that a submitted transaction will be a public transaction. A value of 2 may indicate a public-confidential transaction. A value of 3 may indicate a semi-private transaction, and a value of 4 may indicate a fully-private transaction. Of course, these parameter values and their corresponding indications are exemplary only, and the underlying concept may be realized through different parameter values that map to, or indicate, a desired transaction encryption state (privacy) and destination chain.

Whether via a graphical user interface, programmatically, or otherwise, a sequencing engine may receive a transaction order, e.g., via a method call to an API method exposed by the sequencing engine. The transaction order may include an amount parameter and an instructional parameter. Upon receipt of a method call and included parameters, a sequencing engine may queue the received transaction for batching and execution operations. The sequencing engine may then generate transaction batches (i.e., rollups) from a number of received transaction orders as discussed in more detail, herein.

In accordance with aspects, a sequencing engine may receive transaction orders and may sort the transactions based on corresponding instructional parameters. Aspects may, at an ordering layer (i.e., a layer managed by the sequencing engine), order the transactions in a logical (e.g., a chronological) sequence. A rollup generation layer (i.e., a layer that may also be managed by the sequencing engine) may then categorize the transactions further based on their corresponding instructional parameters. For instance, for each incoming transaction order, a sequencing engine may evaluate one or more instructional parameters and may sort the corresponding transaction with transactions having like instructional parameters. That is, a transaction order indicating a public transaction type may be sorted with other public transactions, a transaction order indicating a semi-private transaction may be sorted with other semi-private transactions, and so on. A sequencing engine may be configured to generate transaction batches for each category of transaction type that the generation engine is configured to sort on.

A sequencing engine may generate a rollup batch of transactions for a particular category of transactions based on a number of received and/or executed transactions for the category meeting or exceeding a threshold number (i.e., a batch is generated for every 100 transaction requests received), periodically (i.e., every 1, 5, or 10 minutes, or any necessary or desirable time interval), or based on any other suitable criteria. In some aspects, transactions are sorted according to their indicated instructional parameter(s) and executed with like transactions as they are received. In some aspects, a sequencing engine may be in operative communication with several virtual machines, where each virtual machine executes transactions associated with different instructional parameters at an execution engine or in an execution layer designed for each category of transactions that the generation engine is configured to sort on. Transactions received for a particular instructional parameter category are executed on the corresponding virtual machine in the execution engine/layer.

Once a number of transactions for a given category have been sequenced, a sequencing engine may generate a transaction batch of like transactions. A batch of transactions that has been sequenced and correctly formed may then be executed by a corresponding off-chain virtual machine of a rollup platform configured to execute transaction batches having one or more particular instructional parameters. An off-chain virtual machine refers to a virtual machine for executing batched transactions locally at a roll-up platform.

A particular batch (i.e., a batch of transactions having similar instructional parameters associated therewith) may be executed by a specific VM (i.e., a VM configured to execute transactions having the similar instructional parameter associated therewith). For example, a private batch of transactions requiring privacy is executed by a privacy preserving VM (i.e., a zero-knowledge virtual machine configured to support confidentiality of transactions through encryption techniques, thereby ensuring privacy). Likewise, a batch of transactions associated with a public instructional parameter may be executed by a standard zero-knowledge virtual machine, since no confidentiality is required. In either exemplary case, however, scalability will be provided by default.

A rollup platform may maintain and execute a virtual machine for each type of transaction that a sequencing engine is configured to recognize and generate transaction batches for. For instance, a rollup platform may invoke/ execute a VM configured to execute public-confidential transactions that includes logic for executing and encrypting public confidential transactions. Likewise, corresponding virtual machines may be maintained and invoked/executed by a rollup platform for semi-private, fully-private, public, and any other transaction types that the sequencing engine is configured to sort and/or batch. In exemplary aspects, these VMs may be Ethereum® Virtual Machines (EVMs), or they may be different types of VMs that support different base chain environments. Moreover, different types of VMs may be configured for support based on the type of the batch of transactions (e.g., a VM dedicated to executing only public batches of transactions, or another VM dedicated to executing only private batches of transactions, etc.).

After a batch of transactions has been executed by an appropriate VM, a cryptographic zero-knowledge validity proof may be generated by a proof generation engine for the transactions included in the executed batch. Exemplary types of, or protocols for generating, validity proofs include zero-knowledge succinct non-interactive argument of knowledge ("ZK-SNARK") proofs and zero-knowledge scalable transparent argument of knowledge ("ZK-STARK") proofs, but any suitable or desirable validity proof may be used with the techniques described herein. A rollup platform may then build a data package that includes a rollup block, a validity proof that is generated for and associated with the rollup block, other metadata as described herein, and a batch-type parameter that indicates, e.g., the type of transactions that were executed in the associated rollup batch and the type of base chain that the rollup block will be written to.

In accordance with aspects, a routing engine of a rollup platform may receive a data package including a batch-type parameter from a proof generation engine and may route the data package to an appropriate destination chain based on the batch-type parameter received with a data package. That is, a routing engine of a routing layer may evaluate a batch-type parameter received with a transaction batch and may route the data package to a destination chain indicated by the batch-type parameter. In some aspects, a routing engine may include a machine learning model that is trained to route data packages to an appropriate destination chain based on characteristics of a received data package. Accordingly, a routing engine may route a transaction batch having batch-type parameter or other characteristics that indicates a public destination chain to a public (and unencrypted) blockchain for recordation. Similarly, a routing engine may route a transaction batch having a batch-type parameter or other characteristics that indicates a fully-private destination chain to a private and encrypted blockchain (e.g. a private enterprise blockchain).

Once received by the appropriate destination chain, an on-base chain smart contract (i.e., a "rollup smart contract") executed at the destination chain may verify the zero-knowledge validity proof and may record the rollup block and any other updates included in the received data package and associated with the received rollup block to the destination chain. In accordance with aspects, an enterprise rollup platform may deploy a transaction-type specific rollup smart contract to each destination chain that the rollup platform is configured to post rollup transactions to. For instance, a rollup platform may deploy a semi-private smart contract that is configured to verify a validity proof provided with a data package and verify that the transactions (i.e., semi-private transactions) are executed correctly by the off-chain virtual machine (i.e., the base chain virtual machine). A rollup platform may further deploy a public-confidential smart contract to a public blockchain to verify a received public-confidential data package (i.e., rollup block, associated zero-knowledge validity proof, included metadata, etc.), and so on.

Aspects of an enterprise rollup platform may also include or be in operative communication with a governance layer and engine. A governance engine may be configured to generate and maintain verifiable credentials and authorization processes that provide users (either end users or platform-level users—e.g., consortium members that host destination chain nodes and/or instances of an enterprise rollup platform) of the platform with secure access to the platform and permissioned access to components and corresponding services of the platform. For example, at the end-user level, a rollup platform, using a governance engine, may determine that a user's credentials only permit the user to transact on a public destination chain, but not on a private destination chain that is offered by the implementing organization or consortium. End-user level permissions may be based on, e.g., subscriptions or service contracts that an end user contracts and/or pays for.

Moreover, at a platform level, permissions provided and implemented by a governance engine may govern access to various processes provided by the platform and any underlying (e.g., layer 1) blockchain platforms that are implemented. For instance, a consortium member may implement an instance of an enterprise rollup platform, but a governance engine may only allow access by the consortium member to particular services. For instance, a consortium member may only be permissioned to post transaction batches to a public destination chain, or only to a private destination chain. In other instances, a member may not be permissioned to perform its own transaction rollups, etc.

In accordance with aspects, a governance engine may be configured to receive login credentials, and API interfaces and/or methods may then be made available based on the provided credentials. In some aspects, user credentials may be held in, or associated with, a user's wallet application. A wallet application is a client application (e.g., a mobile application) that may interface with an enterprise rollup platform. For example, a wallet application may interface with an API of a sequencing engine of an enterprise rollup platform.

In accordance with aspects, an enterprise rollup platform may include an interoperability layer and engine. An interoperability engine may provide a communication scheme/protocol for connections and sending and receiving of communications with other instances of a rollup platform. For instance, an interoperability engine may facilitate sending transactions to a different instance of a rollup platform. That is, an interoperability engine may include or act as a load balancer between instances of a rollup platform (e.g., instances executing on various consortium member nodes). Communications may be formatted as, or similar to, messages a messaging system (i.e., a message queue system). Messages may provide transmission of transactions for load balancing among rollup platform instances and may also communicate consensus information among instances of rollup platforms.

An interoperability engine/layer may also provide connectivity with clearing networks, regulators, cross industry networks (e.g., health, e-government, tax department, and/or interbank connectivity). Through governance layer implemented controls using verifiable credentials or other means of identity management (e.g., a governance engine), access may be given to regulators, or other network participants to audit, read required data, and generally interface with the enterprise rollup platform to perform functions according to the role assigned to them and issued as a verifiable credential. In some aspects, an audit trail may be submitted to a regulator's blockchain or network through the interoperability layer, thereby further enhancing the utility of a rollup provider as a "truth layer". In exemplary aspects, a zero-knowledge proof indicating a correct amount of tax from a client has been submitted without revealing the actual amount submitted. In exemplary aspects, a proof indicating correct adherence to certain regulatory policies may be implemented. Aspects may primarily use the interoperability layer to interoperate with other consortium members, or industries or other networks in the distributed (networked) ecosystem.

FIG. 1 is a block diagram of a system for providing an enterprise rollup platform, in accordance with aspects. System 100 includes base chain 110, base chain 112, rollup platform instance 120, rollup platform instance 130, and rollup platform instance 140. Base chain 110 and base chain 112 each may be any suitable blockchain platform, such as an Ethereum® blockchain, and each may act as a destination chain for rollup platform instance 120, rollup platform instance 130, and rollup platform instance 140. For instance, rollup platform instance 130 may send a data package including a rollup block, a validity proof and metadata (including, e.g., a batch-type parameter) to either base chain 110 or base chain 112 based on the batch-type indicated by the metadata. Rollup platform instance 120, rollup platform instance 130, and rollup platform instance 140 are shown in rollup network 150, and may interact and function within rollup network 150 as described herein.

Figure 2:
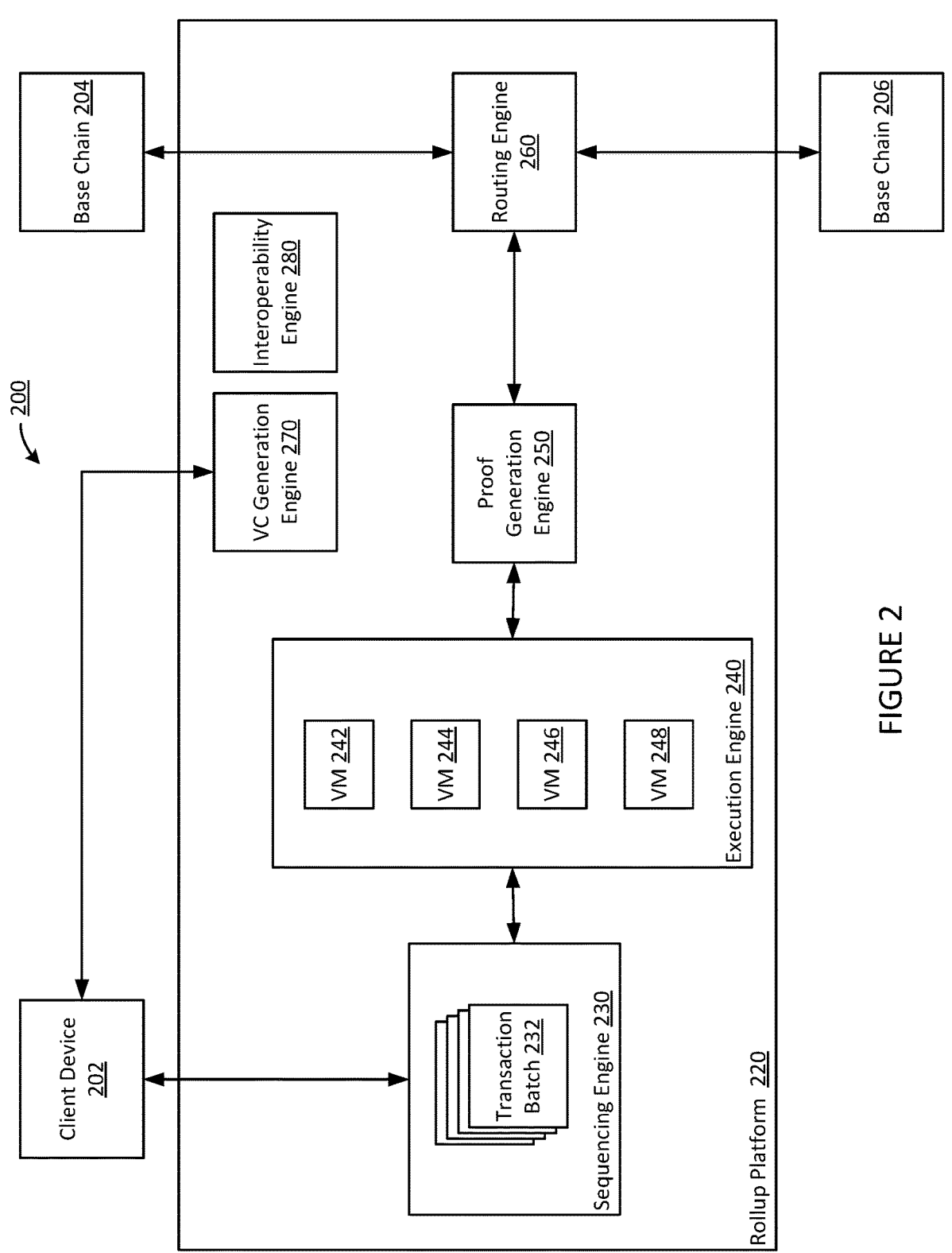
FIG. 2 is a block diagram of a system for providing an enterprise rollup platform, in accordance with aspects.

FIG. 2 is a block diagram of a system for providing an enterprise rollup platform, in accordance with aspects. System 200 includes client device 202, base chain 204, base chain 206, and rollup platform 220. Rollup platform 220 includes sequencing engine 230, execution engine 240, proof generation engine 250, and routing engine 260. As described herein, client device 202 may send a transaction to sequencing engine 230. Sequencing engine 230 may receive the transaction, including an instructional parameter and may generate transaction batch 232 from the received transaction and multiple other received transactions having a same instructional parameter value. Transaction batch 232 may be generated as described herein. 232 may be sent to execution engine 240 for execution.

Execution engine 240 includes virtual machine (VM) 242, VM 244, VM 246, and VM 248. Each of VM 242, VM 244, VM 246, and VM 248 may be a virtual machine configured to execute transaction batches within rollup platform 220. Each of VM 242, VM 244, VM 246, and VM 248 may be configured to execute a different transaction type that may be later routed to a particular type of base chain. For instance, VM 242 may be configured to execute and encrypt fully private transactions for recordation on a private Quorum® base chain, while VM 244 may be configured to execute public transactions for recordation on a public Ethereum® base chain. Sequencing engine 230 may be configured to send transaction batch 232 to the appropriate VM of execution engine 240 based on a value of the like instructional parameters received with each individual transaction request of transaction batch 232, as described in detail herein.

After execution (and encryption, if indicated) by the appropriate VM, execution engine 240 may generate a rollup block. Additionally, proof generation engine 250 may generate a validity proof for the rollup block as described herein. Rollup platform 220 may generate a data package including the rollup block, the validity proof and additional metadata. The additional metadata may indicate a batch type via an included batch-type parameter or other included metadata. Routing engine 260 may then route the data package to an appropriate base chain based on the indicated batch type. Routing engine 260 may evaluate a batch-type parameter and route the data package to an indicated destination chain based on rules or may include a machine learning engine that is trained to determine a batch type based on the received data package as input to the machine learning engine. Other routing schemes may be used as is necessary or desirable.

Routing engine 260 may route a data package to either base chain 204 or base chain 206 based on the indicated batch type. For instance, if base chain 204 is a private Quorum® base chain and a received batch type indicates a fully private batch type for recordation on the Quorum® base chain, the routing engine 260 may route the received data package to base chain 204 for recordation as discussed herein. On the other hand, if base chain 206 is a public Ethereum® base chain and the received batch type indicates a public batch type for recordation on public Ethereum® base chain, the routing engine 260 may route the received data package to base chain 206 for recordation as discussed herein.

System 200 may further include verifiable credential generation engine 270 and interoperability engine 280. Interoperability engine 280 may interface and provide connectivity with local and outside systems as described herein. Verifiable credential generation engine 270 may generate and issue verifiable credentials for networked rollup platform nodes and users and/or client devices and software as described herein.

FIG. 3 is a logical flow for providing an enterprise rollup platform, in accordance with aspects.

Step 310 includes receiving, at a rollup platform, a transaction request, wherein the transaction request includes an instructional parameter.

Step 320 includes generating, by the rollup platform, a transaction batch, wherein the transaction batch includes the transaction request and a plurality of other transaction requests, and wherein each of the plurality of other transaction requests include the instructional parameter.

Step 330 includes executing, by a virtual machine of the rollup platform, the transaction batch, wherein the virtual machine is configured to execute a type of transaction indicated by the instructional parameter, and wherein executing the transaction batch generates a rollup block.

Step 340 includes generating, by the rollup platform, a validity proof for the rollup block.

Step 350 includes generating, by the rollup platform, a data package including the rollup block, the validity proof, and metadata, wherein the metadata indicates a batch type.

Step 360 includes routing the data package to a destination chain based on the batch type for recordation on the destination chain.

In accordance with aspects, an exemplary process flow may begin with a user of a rollup platform submitting a transaction to the platform. A user may initiate a transaction on the enterprise rollup layer-2 network containing rollup platform providers. There may be only a single rollup provider or multiple rollup providers configured in a network setting, as described herein. The transaction may be signed by the user's private key, ensuring authenticity and authorization. The transaction contains all necessary information, such as sender and receiver addresses, transaction amount, and any additional data required for the specific type of transaction. The transaction may include an instructional parameter, as described herein.

The transaction is submitted to a rollup platform operator, who acts as a validator and aggregator. The operator collects multiple transactions from various users and orders them, e.g., chronologically based on their arrival time. This ensures that transactions are processed in the order they were submitted, maintaining consistency, and preventing conflicts. At this point the aggregator also categorizes the transactions according to their instructional parameter types into separate batches which are marked with the noted type based on the associated instructional parameter. At this stage if in a network configuration, (i.e., if the implementing organization operates a rollup platform as one of several nodes on a larger rollup-platform network, either public or private), then the provided rollup platform is a "proposer," which is discussed in more detail, herein.

Once a batch of transactions is formed and sequenced (e.g., by a sequencing engine), the batch is sent for execution (e.g., by an execution engine) executes the transactions locally off-chain i.e., on the local virtual machine and outside of the layer-1 base chain. As noted above, execution of the transaction batch off of the base chain significantly reduces the computational burden on the base chain, thereby improving overall scalability. Execution may be performed by a single VM or multiple VMs. For a specific type of batch of transactions, a specific type of VM may be used. For example, in order to process fully private transactions, a zero-knowledge Ethereum virtual machine (ZK-EVM) may be used which provides privacy (encryption) and scalability. Alternatively, for a public transactions batch, a standard ZK-EVM is used that would provide only scalability.

After execution of a transaction batch, rollup platform may generate a cryptographic proof (i.e., a zero-knowledge validity proof). A validity proof mathematically demonstrates the validity of the transactions in a transaction batch without revealing the underlying transaction data or private information. The validity proof ensures that the transactions were executed correctly and in a specified order, without any fraudulent activity. Generated validity proofs may also contain additional metadata which describes the type of the transaction batch that these proofs contain. This metadata may include a batch-type parameter and/or other metadata that may describe the type of transaction and/or the type of destination chain where the transaction should be routed for recordation.

A routing engine may be configured to route data packages including proofs and metadata to an appropriate destination chain based on, e.g., the metadata. The routing engine may be rules-based, model based, etc.

The data package is submitted to the destination chain by the routing engine. The layer-1 network (i.e., the base chain) verifies the validity of the proof, ensuring that the transactions were executed correctly and in the specified order. The verification process includes checking the mathematical validity of the validity proof and ensuring that the summary of transactions matches the state transition resulting from the execution at the rollup platform. The base chain may be any destination chain that is appropriate for the transaction batch-type (e.g., public Ethereum® base chain, a public confidential base chain, a fully private Quorum® base chain, etc.). In the instance of a semi-private or fully private transaction batch, the destination chain may be a permissioned blockchain. The base chain types described herein are exemplary and a routing engine may be configured to route data packages to other base chain types as necessary or desired using the techniques described herein. A routing engine may further be configured to submit the proofs to any chain by adding a further additional metadata optionally at the time of proof submission.

Upon successful verification of the zero-knowledge validity proof, the destination chain (e.g., a public or private permissioned destination chain) updates its state to reflect the changes resulting from the batched transactions. This ensures that the layer-2 state is synchronized with the layer-1 state, maintaining overall consistency. The state update process involves updating account balances, contract storage, and any other relevant state variables affected by the transactions. Once the state update is complete, the transactions within the transaction batch are considered finalized. This means that the transactions are irreversible and have been securely recorded on both the layer-2 and layer-1 blockchains. Finalized transactions cannot be disputed or reversed, providing users with assurance that their transactions have been permanently executed and recorded.

In accordance with aspects, a rollup platform may be a central server/service owned by a single entity or it may be configured as a node on a network composed of multiple rollup platforms. Each node on a network of rollup platforms may be provided by a different implementing organization. In some aspects, an implementing organization may provide more than one instance of a rollup platform, depending on configurations of the platform.

In a networked environment, each rollup platform node can be owned by a participating entity (e.g., a bank) which will result in decentralization. Each rollup platform node can be hosted on an organization's technology infrastructure, e.g., within the primary implementing organization's premises, or a cloud in control of each participant. In some aspects, each rollup platform node may be hosted at a cloud environment in control of the primary provider.

In a networked environment, each instance of a rollup platform may be configured to use a byzantine fault tolerant (BFT) consensus protocol to achieve consensus on a transaction batch that is submitted for execution. After a consensus agreement among rollup platform nodes with respect to a transaction batch, the batch may be submitted for execution at the destination chain, as described herein. In some aspects, a leader may be elected as a proposer of a next rollup transaction batch. Once a leader has proposed a rollup transaction batch for execution the next leader is elected as a proposer for a next batch of transactions. Leader election may be a round robin process commonly used in BFT style protocols. In some aspects, a leader election scheme may be based on a verifiable random function (VRF). Members of a network are issued with a verifiable credential that allows members to have assigned rights in the network. E.g., a verifiable credential may allow a network participant to become a member of the pool from which a proposer is elected through round robin or VRF based process. Members of a network may be trusted partners who are trusted to see everything and are the core members of the network.

In accordance with aspects, a user (e.g., a customer) that submit transactions to a rollup platform may do so via APIs, and/or through institution-issued user wallets that may reside on a user's smart phone, desktop system, web browser, etc. Users may also be issued with verifiable credentials that may be stored in their wallet or may be associated with a user account or profile, etc., that may allow users certain assignable permissions (e.g., permission to submit a transaction, permission to submit only a specific type of transaction, or some other permission). These may be a fine grained level permissions. Verifiable credentials may further be used for identity verification and ascertaining which functions a user may perform on the enterprise rollup platform. In some credentialing schemes verification data such as usernames and passwords may also be used. IN some aspects, a verifiable credential-base model allowing access to the network through a service provider issued wallet and verifiable credential may be used (and may be more appropriate in various configurations. In a single centralized rollup provider scenario or networked scenario, the users can submit transactions to the rollup provider through the wallet.

Figure 4:
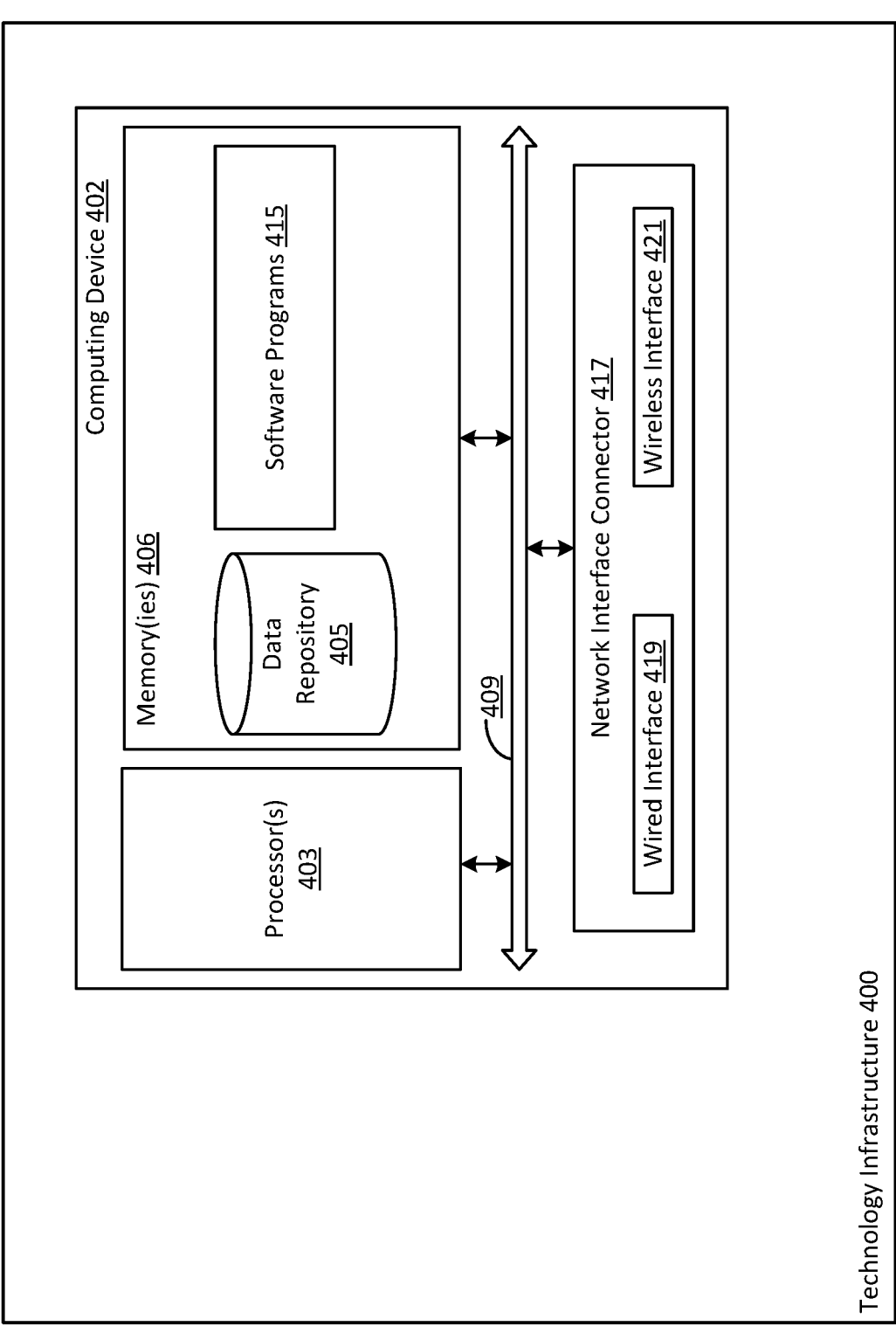
FIG. 4 is a block diagram of a technology infrastructure and computing device for implementing certain aspects of the present disclosure, in accordance with aspects.

FIG. 4 is a block diagram of a technology infrastructure and computing device for implementing certain aspects of the present disclosure, in accordance with aspects. FIG. 4 includes technology infrastructure 400. Technology infrastructure 400 represents the technology infrastructure of an implementing organization. Technology infrastructure 400 may include hardware such as servers, client devices, and other computers or processing devices. Technology infrastructure 400 may include software (e.g., computer) applications that execute on computers and other processing devices. Technology infrastructure 400 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 400 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 400 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 400 includes network routers, switches, and firewalls, which may comprise hardware, software, and/or firmware that facilitates transmission of data across a network medium. Routers, switches, and firewalls may include physical ports for accepting physical network medium (generally, a type of cable or wire e.g., copper of fiber optic wire/cable) that forms a physical computer network. Routers, switches, and firewalls may also have "wireless" interfaces that facilitate data transmissions via radio waves. A computer network included in technology infrastructure 400 may include both wired and wireless components and interfaces and may interface with servers and other hardware via either wired or wireless communications. A computer network of technology infrastructure 400 may be a private network but may interface with a public network (such as the internet) to facilitate operative communication between computers executing on technology infrastructure 400 and computers executing outside of technology infrastructure 400.

FIG. 4 further depicts exemplary computing device 402. Computing device 402 depicts exemplary hardware that executes the logic that drives the various system components described herein. Servers and client devices may take the form of computing device 402. While shown as internal to technology infrastructure 400, computing device 402 may be external to technology infrastructure 400 and may be in operative communication with a computing device internal to technology infrastructure 400.

In accordance with aspects, a rollup platform and rollup platform system components such as sequencing engine, an execution engine a proof generation engine, a routing engine, base chains, client devices, servers, various database engines and database services, and other computer applications and logic may include, and/or execute on, components and configurations the same, or similar to, computing device 402.

Computing device 402 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 402 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

receiving, at a rollup platform, a transaction request, wherein the transaction request includes an instructional parameter;

generating, by the rollup platform, a transaction batch, wherein the transaction batch includes the transaction request and a plurality of other transaction requests, and wherein each of the plurality of other transaction requests include the instructional parameter;

executing, by a virtual machine of the rollup platform, the transaction batch, wherein the virtual machine is configured to execute a type of transaction indicated by the instructional parameter, and wherein executing the transaction batch generates a rollup block;

generating, by the rollup platform, a validity proof for the rollup block;

generating, by the rollup platform, a data package including the rollup block, the validity proof, and metadata, wherein the metadata indicates a batch type; and routing the data package to a destination chain based on the batch type for recordation on the destination chain.

2. The method of claim 1, wherein the rollup block is compressed.

3. The method of claim 1, wherein the rollup platform is a node in a networked environment of rollup platforms.

4. The method of claim 1, wherein the instructional parameter indicates either a public destination chain or a private destination chain, and wherein the instructional parameter indicates either an encrypted transaction type or an unencrypted transaction type.

5. The method of claim 4, wherein the instructional parameter indicates the public destination chain and the unencrypted transaction type.

6. The method of claim 4, wherein the instructional parameter indicates the private destination chain and the unencrypted transaction type.

7. The method of claim 4, wherein the instructional parameter indicates the private destination chain and the encrypted transaction type.

8. A system comprising at least one computer including a processor and a memory, wherein the at least one computer is configured to:

receive, at a rollup platform, a transaction request, wherein the transaction request includes an instructional parameter;

generate, by the rollup platform, a transaction batch, wherein the transaction batch includes the transaction request and a plurality of other transaction requests, and wherein each of the plurality of other transaction requests include the instructional parameter;

execute, by a virtual machine of the rollup platform, the transaction batch, wherein the virtual machine is configured to execute a type of transaction indicated by the instructional parameter, and wherein executing the transaction batch generates a rollup block;

generate, by the rollup platform, a validity proof for the rollup block;

generate, by the rollup platform, a data package including the rollup block, the validity proof, and metadata, wherein the metadata indicates a batch type; and route the data package to a destination chain based on the batch type for recordation on the destination chain.

9. The system of claim 8, wherein the rollup block is compressed.

10. The system of claim 8, wherein the rollup platform is a node in a networked environment of rollup platforms.

11. The system of claim 8, wherein the instructional parameter indicates either a public destination chain or a private destination chain, and wherein the instructional parameter indicates either an encrypted transaction type or an unencrypted transaction type.

12. The system of claim 11, wherein the instructional parameter indicates the public destination chain and the unencrypted transaction type.

13. The system of claim 11, wherein the instructional parameter indicates the private destination chain and the unencrypted transaction type.

14. The system of claim 11, wherein the instructional parameter indicates the private destination chain and the encrypted transaction type.

15. A non-transitory computer readable storage medium, including instructions stored thereon, which instructions, when read and executed by one or more computer processors, cause the one or more computer processors to perform steps comprising:

receiving, at a rollup platform, a transaction request, wherein the transaction request includes an instructional parameter;

generating, by the rollup platform, a transaction batch, wherein the transaction batch includes the transaction request and a plurality of other transaction requests, and wherein each of the plurality of other transaction requests include the instructional parameter;

executing, by a virtual machine of the rollup platform, the transaction batch, wherein the virtual machine is configured to execute a type of transaction indicated by the instructional parameter, and wherein executing the transaction batch generates a rollup block;

generating, by the rollup platform, a validity proof for the rollup block;

generating, by the rollup platform, a data package including the rollup block, the validity proof, and metadata, wherein the metadata indicates a batch type; and routing the data package to a destination chain based on the batch type for recordation on the destination chain.

16. The non-transitory computer readable storage medium of claim 15, wherein the rollup block is compressed.

17. The non-transitory computer readable storage medium of claim 15, wherein the rollup platform is a node in a networked environment of rollup platforms.

18. The non-transitory computer readable storage medium of claim 15, wherein the instructional parameter indicates either a public destination chain or a private destination chain, and wherein the instructional parameter indicates either an encrypted transaction type or an unencrypted transaction type.

19. The non-transitory computer readable storage medium of claim 18, wherein the instructional parameter indicates the public destination chain and the unencrypted transaction type.

20. The non-transitory computer readable storage medium of claim 18, wherein the instructional parameter indicates the private destination chain and the unencrypted transaction type.

* * * * *